United States Patent
Zucker et al.

(10) Patent No.: US 11,423,648 B2
(45) Date of Patent: Aug. 23, 2022

(54) ITEM RECOGNITION PROCESSING OVER TIME

(71) Applicant: NCR Corporation, Atlanta, GA (US)

(72) Inventors: Brent Vance Zucker, Roswell, GA (US); Adam Justin Lieberman, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 42 days.

(21) Appl. No.: 16/144,036

(22) Filed: Sep. 27, 2018

(65) Prior Publication Data
US 2020/0104594 A1 Apr. 2, 2020

(51) Int. Cl.
*G06V 20/20* (2022.01)
*G06Q 20/20* (2012.01)
*G06K 7/14* (2006.01)
*G06V 10/20* (2022.01)
*G06V 10/75* (2022.01)
*H04W 4/35* (2018.01)

(52) U.S. Cl.
CPC .......... *G06V 20/20* (2022.01); *G06K 7/1413* (2013.01); *G06Q 20/20* (2013.01); *G06Q 20/208* (2013.01); *G06V 10/255* (2022.01); *G06V 10/757* (2022.01); *H04W 4/35* (2018.02)

(58) Field of Classification Search
CPC ............ G06K 7/1413; G06K 9/00671; G06K 9/3241; G06K 9/6211; G06Q 20/208; H04W 4/35
See application file for complete search history.

(56) References Cited

U.S. PATENT DOCUMENTS

| | | | | |
|---|---|---|---|---|
| 9,177,225 | B1 * | 11/2015 | Cordova-Diba | G06T 5/00 |
| 10,157,332 | B1 * | 12/2018 | Gray | G06K 9/00671 |
| 2018/0157939 | A1 * | 6/2018 | Butt | G06K 9/4671 |
| 2018/0314878 | A1 * | 11/2018 | Lee | G06K 9/3241 |
| 2019/0080207 | A1 * | 3/2019 | Chang | G06K 9/723 |
| 2019/0149725 | A1 * | 5/2019 | Adato | H04N 1/00 |
| | | | | 348/158 |

OTHER PUBLICATIONS

Wojke, Nicolai, et al., "Simple Online and Realtime Tracking with a Deep Association Metric", 2017 IEEE International Conference on Image Processing (ICIP), (Sep. 2017), 5 pages.

* cited by examiner

*Primary Examiner* — David Bilodeau
(74) *Attorney, Agent, or Firm* — Schwegman, Lundberg & Woessner (57) ABSTRACT

Time-stamped images are captured for unknown items within a store. Portions of the images are cropped to restrict the cropped images to attributes associated with the unknown items. A set of time ordered cropped images are proved to a trained machine-learning item recognition algorithm, which produces an output of confidence values that map to specific items of the store. When the confidence value meets or exceeds a predefined threshold, the specific item associated with that confidence value is used to identify the unknown item. The known item is assigned to an appropriate shopping cart of a shopper based on tracking from the images of the shopper while in the store.

9 Claims, 4 Drawing Sheets

ITEM RECOGNITION PROCESSING OVER TIME

BACKGROUND

Currently shoppers are forced to checkout with items in a store through assisted terminals or self-service terminals (SSTs). Item barcodes are scanned for each item being purchased through terminal-integrated scanners. Thus, stores require dedicated terminals and scanning hardware as part of checking a customer out of a store where items are purchased.

Customers are also forced to handle the each item multiple times for: picking the item off of a shelf and placing the item in a cart, removing the item from the cart so that the item can be scanned by the scanning hardware at the terminals, placing the item in a bag once scanned, and removing the item from the bag when at home to store the item. The customer may handle each item four times. At a minimum, the customers handle each item three times (the store may provide staff to bag the item once scanned for purchase).

During self-checkouts at SSTs, a customer is forced to locate the proper bar code on each item so that the barcode can be placed in the line of sight of the scanning hardware or the customer may have to navigate the SST touchscreen interface to lookup the proper code for each produce item during checkout. Such activities frustrate the customer and can cause queues at the SSTs to grow during times of heavy traffic at the store (such as during the holiday season). Frequently, an attendant has to assist the customer at some point during the self-checkout transaction, which can add to customer frustration and queue growth.

SUMMARY

In various embodiments, methods and a system for item recognition image processing over time are presented.

According to an embodiment, a method for item recognition image processing over time is presented. Images that include at least a portion of an unknown item are cropped into cropped images. The cropped images are inputted into a trained machine-learning item identifier. A list that includes confidences values is received as output from the trained machine-learning item identifier, each confidence value associated with a unique item identifier. A particular item identifier is selected for the unknown item based on a highest confidence value from the confidence values of the list. Finally, the item identifier is provided as a known item for the unknown item to a transaction manager.

DETAILED DESCRIPTION

Figure 1:
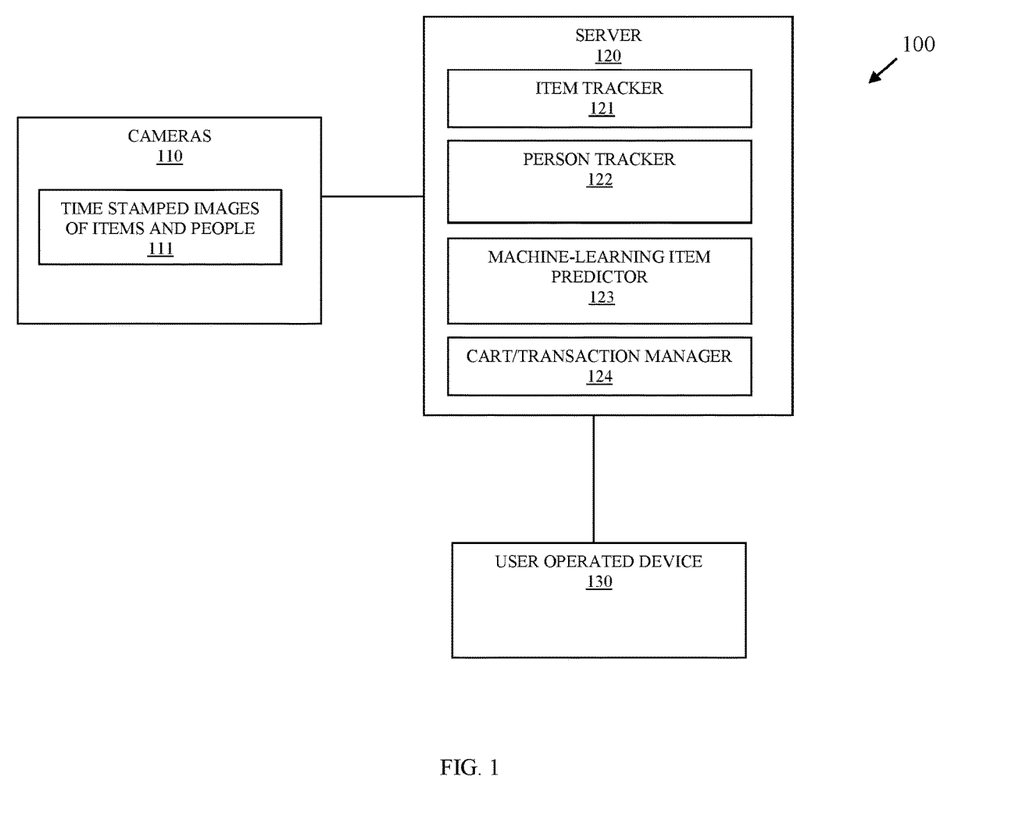
FIG. 1 is a diagram of a system item recognition image processing over time, according to an example embodiment.

FIG. 1 is a diagram of a system 100 for item recognition image processing over time, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of item recognition image processing over time, presented herein and below.

As used herein and below, the terms "customer," "consumer," and "user" may be used interchangeably and synonymously.

The system 100 includes a plurality of cameras 110 that capture time-stamped images of items and people 111 and a server 120. Optionally, the system 100 may include a user-operated device 130. The server 120 includes executable instructions that execute on one or more hardware processors of the server 120 from a non-transitory computer-readable storage medium as: an item tracker 121, a person tracker 122, a machine-learning item predictor 123, and a cart/transaction manager 124.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 being capturing the time-stamped images 111 in frames. In an embodiment, the cameras 110 capture images at a rate of 20 to 30 frames per second.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own separate machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In a similar manner, the item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc.

The pixels in the cropped images are provided in a time ordered sequence (as they are received in time from the cameras 110 and based on the time stamp of the frames 111) as a set of cropped images to the machine-learning item predictor 123, which has initially been trained with multiple images of each item from multiple different angles and lighting conditions. The output of machine-learning item predictor 123 is an ordered list of confidence values or scores representing probability that the item is actually associated with known item identities (item barcode level of detail). The list is ordered from the highest probability to the lowest probability. For example, the list may include the following: 0.8 16 oz. Coke®, 0.6 16 oz. Pepsi®, 0.4 16 oz. Sprite. The first portion of each entry includes the probability and the item identity (could be a different unique product identifier that links to the item barcode detail). The machine-learning item predictor 123 receives a set of cropped item images that are time ordered and the output is ordered probabilities along with information that links each probability to a specific item level of detailed information (such as item barcode detail).

In an embodiment, the set of cropped item images can include multiple different unknown items, the machine-learning item predictor 123 outputs a list for each unknown item (identified by the unknown tracking identifier) along with the probabilities for each unknown item that it is to be associated with a particular known item with a known item identity (code that links to specific item bar code level of detailed information for the item).

In an embodiment, machine-learning item predictor 123 processes a set of linear algebra transformations on the numeric values present in the pixels of the provided cropped images for the unknown items, the output is trained to return a confidence value or probability value for each known item relative to the items available in the store (the items upon which the machine-learning item predictor 123 has been trained). As the machine-learning item predictor 123 receives more training, the accuracy in identifying items (recognizing items) from the cropped images of unknown items improves by the machine-learning item predictor 123 automatically making changes to the linear algebra transformations based on training.

It is to be noted, that only a small subset of pixels are present in the cropped images and from those small cropped images (based on training), the machine-learning item predictor 123 may only need to sample or process a smaller subset of pixel values. As a result, the processing throughput of the machine-learning item predictor 123 is extremely fast and efficient.

The item tracker 121 is configured to identify an unknown item as a specific item based on a comparison of a threshold value against the highest probability returned from the machine-learning item predictor 123 for each unknown item tracker identifier. When the threshold value is met or exceed, the item tracker 121 assumes the unknown item with the unknown tracking identifier is the specific product associated with the highest probability provided by the machine-learning item predictor 123.

In an embodiment, the item tracker 121 is configured to access a plurality of threshold values based on the item code provided with each probability outputted in the list by the machine-learning item predictor 123. For example, a threshold value for Coke® identification may be higher than a threshold value for milk. This allows the accuracy from item identification (recognition) by the machine-learning item predictor 123 to vary by item in the store.

Furthermore, the machine-learning item predictor 123 can be trained during preconfigured periods of time based on actual item identifications that are known. So, over time the machine-learning item predictor 123 accuracy improves for each item in the store. For example, the system 100 can be trained by performing the item recognition processing discussed above while the store operates in a conventional terminal-based checkout for customer transactions. As each item barcode is scanned and each item identity is known, the set of cropped item images are refed back into the machine-learning item predictor 123 with the known item identity that is expected as output. Training can also occur based on customer provided feedback. For example, the customer may participate and agree to have a mobile application on their device 130 such that the item identifier 121 can interact with the mobile application during the customer shopping and request the customer through a notification to scan a particular item that the customer was detected as picking up, or at the end of shopping ask the customer to verify that all the items noted by the item identifier 121 was properly identified and if not ask the customer to provide the proper identification. During other training periods, staff may be notified on staff-operated devices, to approach the customer and scan a particular item. In fact, a variety of techniques can be used to continuously train the machine-learning item predictor 123 to improve its item identification accuracy over time.

Each frame or image 111 includes a unique frame number and the time stamp. When a particular frame is cropped and processed by the person tracker 122 and provided a unique person tracking identifier, such unique person tracking identifier is carried from frame to frame. Similarly, the unique item tracking identifier is carried from frame to frame and when the time stamped images are cropped by the item tracker 121 so as to include a unique person tracking identifier (the item tracker is cropped from pixels associated with a unique person tracking identifier), the unknown item can be associated with the unknown person. But this can change as the time series of images are taken of the customer as the customer traverses the store, such that an unknown item tracking identifier can move or be detected as moving from a first unique person tracking identifier to a second unique person tracking identifier (families or friends may retrieve items for other members of their group). The unknown item may also be placed back on a shelf or at a different location in the store by the unknown person. In fact, the associations between any given unknown item and any given unknown person can change multiple times over time in the images 111 during a single customer's visit to the store.

The time-stamped frame identifiers, the unknown person tracking identifier, and the unknown item tracking identifier are carried as additional metadata with the images 111 in additional to the person attributes and the item attributes processed by the person tracker 122 and the item tracker 121.

The person tracker 122 receives specific item identity codes for the unknown items once the item identifier 121 was able to identify the unknown items based on the threshold comparisons against the output provided by the machine-learning item predictor 123. The associations with the person tracker and item identifier (which is now known) is provided by the person tracker 122 to the cart/transaction manager 124. The cart/transaction manager 124 maintains a cart for each person tracked that includes a listing of all known items and unknown items. The cart can change over time (as a person can discard an item or give an item to a different person) during the customer shopping within the store, or the item identifier 121 can identify an unknown item during the shopping.

Obtaining a true identity of the person can occur in a variety of manners. For example, the customer may have agreed to register an account with the store that include facial recognition, such that once a facial image is obtained by the person tracker 122 or by a dedicated camera 110 within the store, a facial recognition process can map the facial image to the registered customer. In another case, a mobile application on the user device 130 can automatically check in the customer with a registered customer account when the mobile application detects (through device location services) the device's physical location as matching the known physical location for the store. In another scenario, the customer may be provided a barcode for the customer's registered account, and upon entering the store the customer presents the barcode to a check-in scanner (the barcode unique to the customer and linking to the customer's registered account). In another case, the customer uses a camera integrated into the user's device 130 to scan a barcode prominently displayed at an ingress point within the store, this causes a mobile application on the user's device 130 to report a registered account or device number (linked to the customer's registered account) to the server 120. Other techniques can be used as well, such as beacon identifiers relayed by a mobile application of the user's device 130 to the server 120 with a registered mobile device identifier for the user's device 130 (and linked to a registered user account).

Once the customer identity is known, the unknown person tracker identifier can be changed by the person tracker 122 to the known customer identifier that links to the customer's registered account, and the cart/transaction manager 124 assigns the shopping cart to the registered account. Registered accounts can include registered payment methods and/or payment cards, which permits the cart/transaction manager 124 to perform payment processing using the payment method or card when the person tracker 122 identifies the customer in the frames 111 as exiting or entering an egress point of the store. The known items in the shopping cart are processed and when successful payment is confirmed, the cart/transaction manager 124 can generate a transaction receipt and send the receipt electronically in a customer-defined manner provided by the customer in a profile associated with the registered account (such as through a text message to the user device 130 and/or to as an email to a registered email address for the customer).

In an embodiment, unregistered customers (customers whose identities were not matched to any store account) can be directed at an egress point (through digital signage or other signage) to a terminal for payment. The terminal can be cashier assisted and/or a SST. As the customer is detected in the frames by the person tracker 122 as being in front of the terminal, a display of the terminal presents the items in the cart with item level detail and a total for the transaction. The cashier or the customer then process a customer-provided payment card for payment and the customer receipt can be printed.

In some cases, mobile application download barcodes available in the store may permit the customer to scan the barcode on the user device 120 and cause an automatically download of a mobile application to the user device 120. The mobile application when launched reports to the server 120 and the person tracker 122 identifies in the frames the customer when the barcode is scanned and associates that customer with the download. When the customer approaches an egress point, the application requests payment through interaction with the cart/transaction manager 124 and the customer takes a picture of a payment card or enters payment card information for checkout. In this scenario, the customer can remain anonymous. The mobile application instance downloaded associates with the unique device identifier of the user device 120 and registers to the server 120 as an anonymous customer. The next time the customer visits the store, the mobile application when launched by the customer reports the device number and the cart/transaction manager 124 provides the shopping cart for payment by the customer when the customer exits the store.

So, it is to be noted that pre-registered, unknown and unregistered customers, or pseudo anonymous customers (ones in which just a mobile application download and device identifier are known for the customer) can perform item shopping utilizing the system 100 without any barcode scanning by cameras or scanners associated with terminals of the store (Point-Of-Sale (POS) terminals, or SSTs) or associated with a camera of a user's device 130.

In an embodiment, SSTs are provided at an egress point of the store and as each person checks out by approaching or stranding in front of the a SST, the cart/transaction manager pushes the item list and item detail assigned to that person to the display of the SST and requests payment. Any items that are still unknown can be identified through an image retained for that item and instructions can be provided on the display of the SST for the customer to attempt to identify that item and scan that item through a scanner or on the mobile device of the customer. In this way, each item that was not identified can be handled during checkout and the customer is only required to scan a few items from the list of items. Such information is also fed back into the next training session for the machine-learning item predictor 123.

In an embodiment, the system 100 includes one or more of: SSTs and POS terminals (terminals operated by cashiers to check customers out of the store).

In an embodiment, the user-operated device 130 is one of: a phone, a laptop, a tablet, and a wearable processing device.

In an embodiment, the system 100 is deployed in a frictionless store that permits shopping without interaction with any device or any in-store assistance staff. In an embodiment, the customer lacks any mobile device 130 or payment cards when shopping (the customer preregistered for facial recognition and has a registered account with a registered payment method in this embodiment).

In an embodiment, the system 100 is deployed in a traditional store permitting both conventional checkouts and frictionless checkouts/shopping to the customers. In this embodiments, the images 111 captured for a conventional checkout are fed back into the machine-learning item predictor 123 for training.

In an embodiment, the system 100 is deployed in a traditional store permitting conventional checkouts and the item tracker 121, person tracker 122, and machine-learning item predictor 123 are trained until an acceptable level of accuracy is reached, and at such time the system 100 is released for live and real time frictionless shopping and the conventional checkouts are slowly phased out.

Single images of items taking during a frictionless shopping experience can include a variety of pixel conditions that make properly recognizing the item difficult. Each image can represent different camera angles, different distances from the camera lens, different lighting, different background information, different levels of obfuscation (pixels unrelated and partially blocking the true item), etc. So taking these images individually may not result in proper item identification. The system 100 provides a time-based mechanism by which the whole of the available images for the item during a frictionless shopping transaction at a store are processed by the machine-learning item predictor 124 to recognize the item. That is, over time and over the corpus of images taken for an unknown item, the likelihood of properly identifying an item improves substantially when the corpus is taken as a whole over time.

These and other embodiments are now discussed with reference to FIGS. 2-4.

Figure 2:
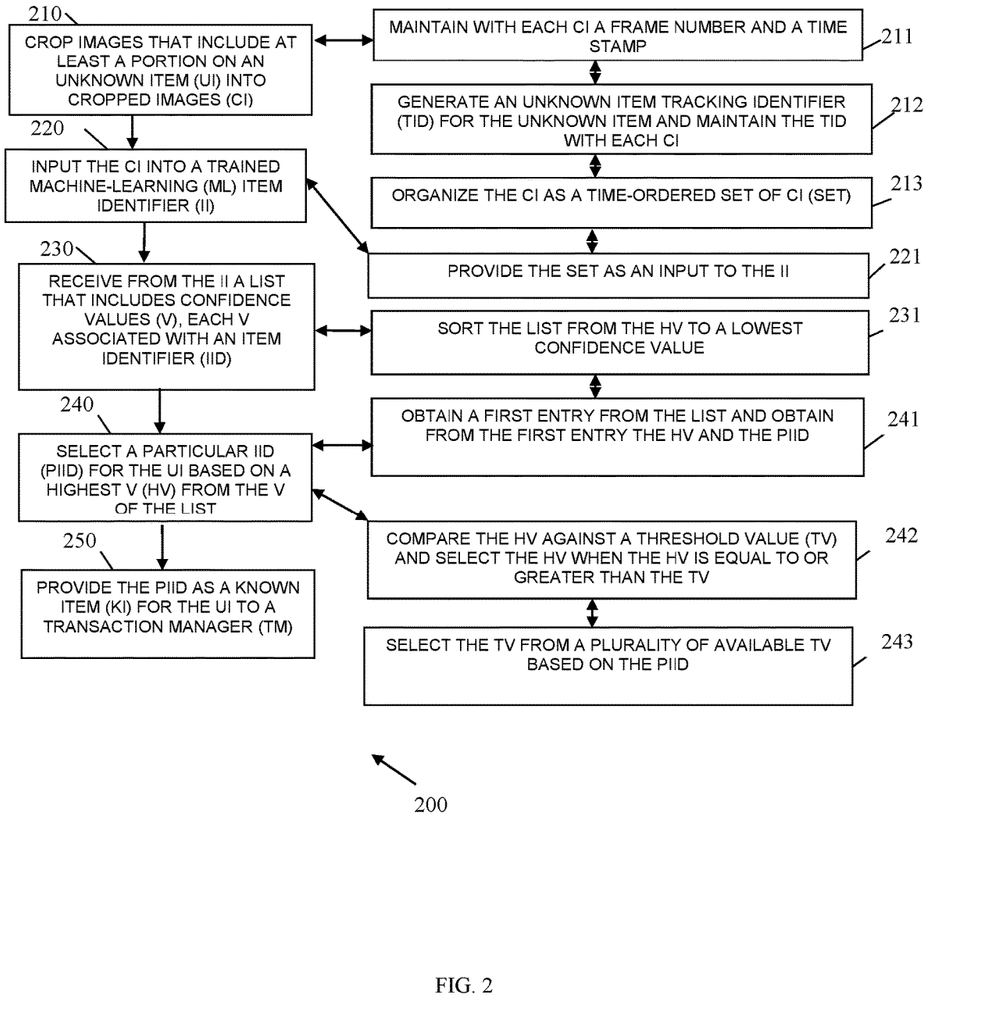
FIG. 2 is a diagram of a method for item recognition image processing over time, according to an example embodiment.

FIG. 2 is a diagram of a method 200 for item recognition image processing over time, according to an example embodiment. The software module(s) that implements the method 200 is referred to as an "item recognizer." The item recognizer is implemented as executable instructions programmed and residing within memory and/or a non-transitory computer-readable (processor-readable) storage medium and executed by one or more processors of a device. The processor(s) of the device that executes the item recognizer are specifically configured and programmed to process the item recognizer. The item recognizer has access to one or more network connections during its processing. The network connections can be wired, wireless, or a combination of wired and wireless.

In an embodiment, the device that executes the item recognizer is the server 120. In an embodiment, the server 120 is a cloud-based server.

In an embodiment, the item recognizer is all or some combination of: the item tracker 121, the person tracker 122, the machine-learning item predictor 123, and/or the cart/transaction manager.

At 210, the item recognizer crops images that include at least a portion of an unknown item into cropped images. The images are acquired from cameras situated throughout a store and on the perimeter (parking) areas of the store. In an embodiment, the cameras are the cameras 110. The cameras provided the images in frames. In an embodiment, the cameras capture the images at a rate of approximately 20/30 frames per second. The cameras provide the images to the server 120 to which the item recognizer executes. Each image is time stamped and includes a unique frame number.

Accordingly, at 211, the item recognizer maintains with each cropped image a frame number and a time stamp that was provided in the original uncropped images.

In an embodiment of 211 and at 212, the item recognizer generates an unknown item tracking identifier for the unknown item and maintains the tracking identifier with each cropped image. That is, the unknown item is assigned a unique identifier to distinguish that unknown item from other unknown items that are being tracked by the item recognizer.

In an embodiment of 212 and at 213, the item recognizer organizes the cropped images as a time-ordered set of cropped images.

At 220, the item recognizer inputs the cropped images into a trained machine-learning item identifier. In an embodiment, the trained machine-learning item identifier is the machine-learning item predictor 123.

In an embodiment of 213 and 220, at 221, the item recognizer provides the set of cropped images as input to the trained machine-learning item identifier.

It should be noted that as images over time are collected for the unknown item (different angles under different lighting and at different locations and having different levels of obfuscation) a decision as to what the unknown item actually is may become easier to discern. However, each individual image for the item taken alone regardless as to when such image was taken (the time stamp) and not within the context of the time-ordered set of all images may provide little distinguishing features for recognizing the item. As such, the set of cropped images can be taken as input and processed as a whole by the trained machine-learning item identifier for item recognition.

At 230, the item recognizer receives back from the trained machine-learning item identifier a list that includes confidence values. Each confidence value associated with an entry and the entry includes an item identifier for a known item within the store.

In an embodiment, at 231, the item recognizer sorts the list from a highest confidence value to a lowest confidence value.

At 240, the item recognizer selects a particular item identifier for the unknown item based on the highest confidence value from the confidence values provided in the list.

In an embodiment of 231 and 240, at 241, the item recognizer obtains a first entry from the list and obtains from the first entry the highest confidence value and the particular item identifier.

In an embodiment, at 242, the item recognizer compares the highest confidence value against a threshold value and the item recognizer selects the highest confidence value when the highest confidence value is equal to or greater than the threshold value.

In an embodiment of 242, at 243, the item recognizer selects the threshold value from a plurality of available and predefined threshold values based on the particular item identifier. That is, the configured acceptable accuracy level can vary based on the item, such that the item recognizer can obtain the particular item identifier from the list and then obtain the specific threshold value for comparing against the confidence value outputted by the trained machine-learning item identifier.

At 250, the item recognizer provides the particular item identifier as a known item for the originally unknown and unrecognized item to a transaction manager. In an embodiment, the transaction manager is the cart/transaction manager 124.

Figure 3:
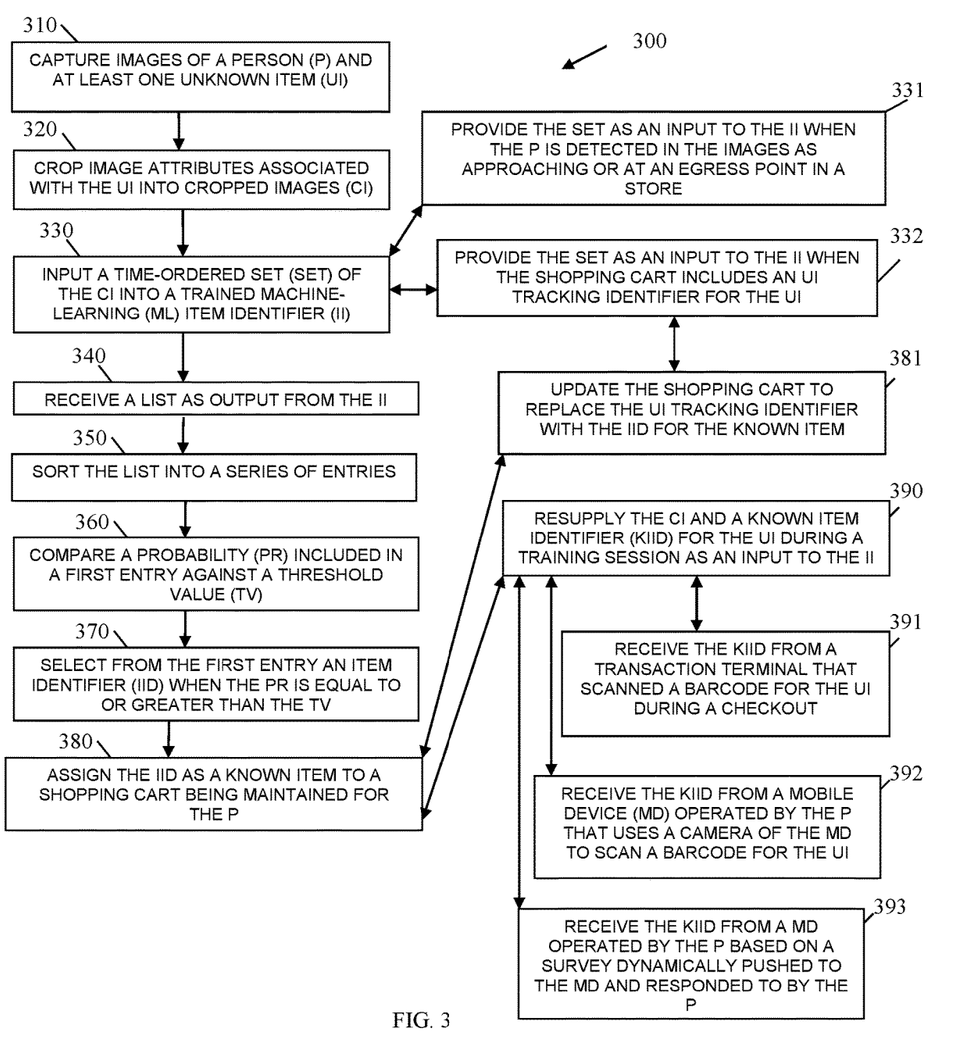
FIG. 3 is a diagram of another method for item recognition image processing over time, according to an example embodiment.

FIG. 3 is a diagram of another method 300 for item recognition image processing over time, according to an example embodiment. The software module(s) that implements the method 300 is referred to as an "item resolver." The item resolver is implemented as executable instructions programmed and residing within memory and/or a non-transitory computer-readable (processor-readable) storage medium and executed by one or more processors of a device. The processors that execute the item resolver are specifically configured and programmed to process the item resolver. The item resolver has access to one or more network connections during its processing. The network connections can be wired, wireless, or a combination of wired and wireless.

In an embodiment, the device that executes the item resolver is the server 120. In an embodiment, the server 120 is a cloud processing environment.

In an embodiment, the item resolver is all of or some combination of: the item tracker 121, the person tracker 122, the machine-learning item predictor 123, the cart/transaction manager 124, and/or the method 200.

The item resolver presents another and in some ways enhanced processing perspective of the method 200 discussed above.

At 310, the item resolver capture images of a person and at least one unknown (presently unrecognized) item. The images are streamed as frames from cameras. In an embodiment, the cameras are the cameras 110.

At 320, the item resolver crops image attributes associated with the unknown item into cropped images. These cropped images are substantially smaller in size than the original captured images. In some cases, there may be just a handful of pixels and corresponding pixel values in each of the cropped images focused on just the item attributes that were cropped out as the cropped images.

At 330, the item resolver inputs a time-ordered set of cropped images into a trained machine-learning item identifier. In an embodiment, the trained machine-learning item identifier is the machine-learning item predictor 123.

In an embodiment, at 331, the item resolver provides the set of cropped images as an input to the trained machine-learning item identifier when the person in the images is detected as approaching or at an egress point in the store. That is, the cropped images may be held because the item resolver may independently at some point in time during the shopping be able to independently identify the unknown item, such that the trained machine-learning item identifier is provided the cropped images when the person is about to leave the store or check out of the store to resolve all those unknown items that the item resolver was unable to independently recognize. This delay in providing the set of cropped images also ensures that the trained machine-learning item identifier has a robust set of cropped images to process when recognizing the item.

In an embodiment, at 332, the item resolver provides the set as input to the trained machine-learning item identifier when the shopping cart (discussed below at 380) includes an unknown item tracking identifier for the unknown item.

At 340, the item resolver receives a list as output from the trained machine-learning item identifier.

At 350, the item resolver sorts the list into a series of entries (ordered from a highest probability to a lowest probability).

At 360, the item resolver compares a probability included in a first entry against a threshold value.

At 370, the item resolver selects from the first entry an item identifier when the probability is equal to or greater than the threshold value.

At 380, the item resolver assigns the item identifier as a known item to a shopping cart being maintained for the person.

In an embodiment of 332 and 380, at 381, the item resolver updates the shopping cart to replace the unknown tracking identifier with the item identifier for the known item.

According to an embodiment, at 390, the item resolver resupplies the set of cropped images and a known item identifier for the unknown item during a training session as an input to the trained machine-learning item identifier. This causes the trained machine-learning item identifier to adjust its factors and linear programming algorithm to ensure that when given the set of cropped images an acceptable probability of that unknown item in those cropped images is determined to be the known item identifier. That is, the trained machine-learning item identifier is continuously provided feedback for actual item identifiers to learn and adjust its item recognition predictions.

In an embodiment, of 390, and at 391, the item resolver receives the known item identifier from a transaction terminal (POS terminal and/or SST) that scanned a barcode for the unknown item during a checkout.

In an embodiment of 390, and at 392, the item resolver receives the known item identifier from a mobile device operated by the person that uses a camera of the mobile device to scan a barcode for the unknown item or that uses the camera to take an image of the a label of the unknown item.

In an embodiment of 390, and at 393, the item resolver receives the known item identifier from a mobile device operated by the person based on a survey that is dynamically pushed to the mobile device and responded to by the person. For example, after a frictionless store experience by a person, a survey is pushed to the mobile of the person asking if any items were misidentified and if so what were the actual items missed.

Figure 4:
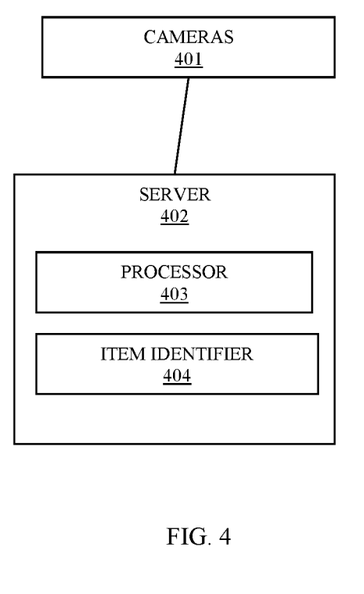
FIG. 4 is a diagram of a system for item recognition image processing over time, according to an example embodiment.

FIG. 4 is a diagram of a system 400 for item recognition image processing over time, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

In an embodiment, system 400 is the cameras 110 and the server 120.

The system 400 includes a plurality of cameras 401 and a server 402. The server 402 includes at least one hardware processor 403 and configured to execute executable instructions from a non-transitory computer-readable storage medium as an item identifier 404.

The item identifier 404 when executed from the non-transitory computer-readable storage medium on the processor 403 is configured to: 1) crop the images as cropped images representing attributes of an unknown item present in the images; 2) assign a unique unknown tracking identifier to the images and the cropped images for the unknown item; 3) input the cropped images as a set of time-ordered unknown item images into a trained machine-learning item identifier; 4) select from output of the trained machine-learning item identifier a known item identifier for a known item; and 5) provide the known item identifier to a shopping cart maintained for a shopper in a store.

In an embodiment, the item identifier 404 is further configured to interact with a shopper tracker to identify the shopping cart of the shopper. In an embodiment, the shopper tracker is the person tracker 122.

In an embodiment of the last embodiment, the item identifier 404 is further configured to interact with a cart/transaction manager to provide the known item identifier for the unknown item to the shopping cart. In an embodiment, the cart/transaction manager is the cart/transaction manager 124.

In an embodiment, the item identifier is all of or some combination of: the item tracker 121, the machine-learning item predictor 123, the method 200, and the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    cropping images into cropped images, each image comprises at least a portion of an unknown item and modifying the cropped images by removing pixels from each of the cropped images that are known to be associated with background objects and that are known to be associated with persons leaving only remaining pixels in each of the cropped images that just comprise item attributes for the unknown item within the corresponding cropped image;
    inputting the cropped images into a trained machine-learning item identifier;
    receiving from the trained machine-learning item identifier a list that includes confidences values, each confidence value associated with an item identifier;
    selecting a particular item identifier for the unknown item based on a highest confidence value from the confidence values of the list; and
    providing the particular item identifier as a known item for the unknown item to a transaction manager.

2. The method of claim 1, wherein cropping further includes maintaining with each cropped image a frame number and a time stamp.

3. The method of claim 2, wherein maintaining further includes generating a unknown item tracking identifier for the unknown item and maintaining the unknown item tracking identifier with each cropped image.

4. The method of claim 3, wherein generating further includes organizing the cropped images as a time-ordered set of cropped images.

5. The method of claim 4, wherein inputting further includes providing the time-ordered set of cropped images as an input to the trained machine-learning item identifier.

6. The method of claim 1, wherein receiving further includes sorting the list from the highest confidence value to a lowest confidence value.

7. The method of claim 6, wherein selecting further includes obtaining a first entry from the list and obtaining from the first entry the highest confidence value and the particular item identifier.

8. The method of claim 1, wherein selecting further includes comparing the highest confidence value against a threshold value and selecting the highest confidence value when the highest confidence value is equal to or exceeds the threshold value.

9. The method of claim 8, wherein comparing further includes selecting the threshold value from a plurality of available threshold values based on the particular item identifier.

* * * * *